Aug. 2, 1927.  1,637,887

R. M. WILSON

VOLTAGE REGULATION OF EXCITERS

Filed March 26, 1924

Inventor:
Robert M. Wilson;
by
His Attorney.

Patented Aug. 2, 1927.

1,637,887

UNITED STATES PATENT OFFICE.

ROBERT M. WILSON, OF MONTCLAIR, NEW JERSEY, ASSIGNOR TO GENERAL ELECTRIC COMPANY, A CORPORATION OF NEW YORK.

VOLTAGE REGULATION OF EXCITERS.

Application filed March 26, 1924. Serial No. 702,133.

My invention relates to dynamo electric machines which are required to supply current at a variable voltage, and has for its object the provision of means for regulating the voltage of such machines in a stable and reliable manner.

It is frequently necessary to operate an electro-dynamic machine at voltages which must be regulated over a very considerable range. Thus in the case of exciters, for example, it not infrequently happens that the voltage must be varied from 100 volts as a minimum to 200 or 250 volts as a maximum. It is customary to produce these variations by means of an exciter field rheostat through the adjustment of which the value of the exciter field flux is controlled. This method of control is satisfactory at the higher voltages when the iron portions of the magnetic circuit are operated at a flux density above the knee of the saturation curve, but at the lower flux densities is unreliable due to the fact that very slight adjustments of the rheostat are apt to produce abnormal changes in the flux and voltage of the exciter.

In accordance with my invention this difficulty is avoided by providing parallel sections in the iron portions of the magnetic circuit and surrounding certain of these sections with bucking coils which are arranged to maintain the flux density required for stable control during low voltage operation of the machine.

My invention will be better understood from the following description when considered in connection with the accompanying drawing, and its scope will be pointed out in the appended claims.

Figure 1:
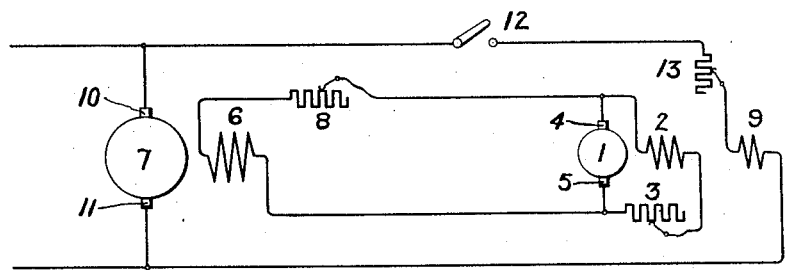
Figure 2:
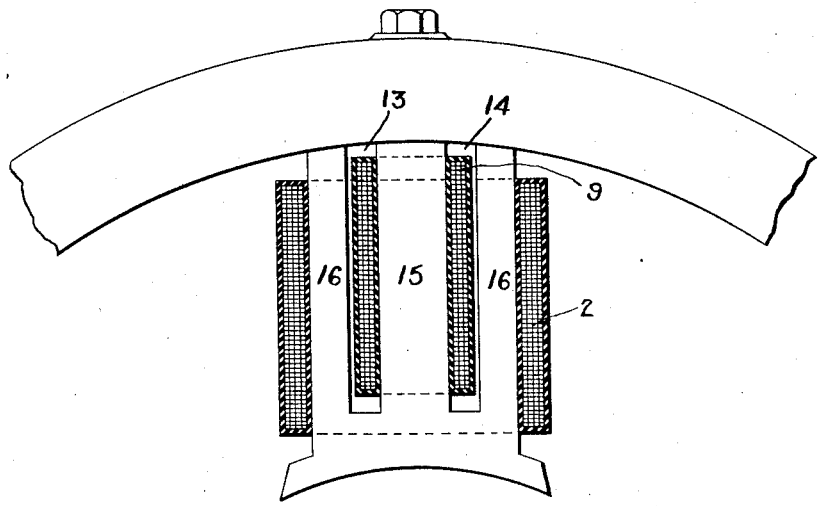

Referring to the drawing, Fig. 1 shows a field control system in which my invention has been embodied; and Fig. 2 shows certain details in the pole core structure and winding arrangement of a machine constructed in accordance with my invention.

Fig. 1 shows an exciter 1 provided with a main field winding 2 and a field rheostat 3 which are shown as connected in series across the brushes 4 and 5 of the exciter. Also connected between the brushes 4 and 5 is a field winding 6 of a generator 7. A rheostat 8 may be provided in the generator field circuit if it is desired to control the generator voltage independently of the exciter voltage. For the purpose of regulating the exciter voltage, a bucking coil 9 is connected to the generator brushes 10 and 11 in series with switch 12 and rheostat 13.

As indicated in Fig. 2, which shows a section through one pole of the exciter, the integral pole cores of the exciter are each provided with slots 13 and 14 cut in from the yoke end of the core. The bucking coil 9 of each pole is placed in the slots 13 and 14 and is wound to produce a flux opposed to that produced by the main winding 2 which surrounds the entire core. If the exciter is to have a range of 250 to 100 volts, the coils 9 should be wound for approximately 100 volts. Assuming that the coils 9 are arranged to maintain between the ends of the section 15 a magnetomotive force as great as that maintained across this section by the main coil 2, there will be no resultant magnetomotive force across this section. Under these conditions the section 15 will carry no flux although the flux density of the sections 16 may be high. It is thus possible to shunt the useful flux through the sections 16 which are consequently maintained at a flux density sufficiently high to insure stable operation of the exciter at low voltages. The flux density in these sections may be further increased by increasing the ampere turns of the coils 9 which will then produce a flux superimposed on the useful flux of the machine. The bucking coils are of course utilized only when the exciter is to be operated at the lower voltages.

When the exciter is put into operation by first manipulating the main coil rheostat to bring the exciter voltage up to its full value and this voltage is thereafter controlled by adjusting the bucking coil rheostat, it is possible to maintain the flux density of the exciter pole cores at a value which insures stable control under all conditions of operation. Assuming the exciter voltage to have been raised to its full value by means of the rheostat 3, the saturation of the pole cores is fairly high and possibly ten per cent of the magnetomotive force of the main field coils is expended in the sections 15. To reduce the exciter voltage, the bucking coils 9 are energized by closure of switch 12 and the rheostat 13 is manipulated to increase the ampere turns of the bucking coils 9 which operate to increase the flux density of the sections 16 as previously explained. Due to this increase in the flux density of the sections 16 the useful flux of the exciter is reduced and less current is delivered to the generator field winding 6. This reduction in generator voltage is followed by a decrease in the current supplied from the generator to the bucking coils and the flux of these coils will, therefore, tend to decrease, but this decrease will not continue indefinitely due to the fact that the main coils tend to build up the exciter voltage. Since the main coils tend to build up and the bucking coils tend to reduce the exciter voltage, the stable operating voltage is determined by the setting of the main and bucking coil resistors.

What I claim as new and desire to secure by Letters Patent of the United States, is:—

1. A dynamo electric machine comprising a yoke member, a pole core removably attached to said yoke member and slotted to form a central core section extending between said yoke member and the tip of said core, a main field winding surrounding said core, and a bucking field winding surrounding only said section.

2. An exciting machine provided with an integral pole core having slots extending inwardly from the yoke ends, a main field winding surrounding said core, and a bucking winding arranged in said slots to produce in the central portions of said core a magnetomotive force which is opposed to that produced therein by said main winding during low voltage operation of said machine.

3. The combination of a dynamo electric machine provided with armature and field windings, and an exciter comprising an armature winding connected to said field winding, a pole core slotted to form a central core section, a main field winding surrounding said core and a bucking field winding surrounding only said central core section and connected to the armature winding of said machine.

In witness whereof, I have hereunto set my hand this twenty-fourth day of March, 1924.

ROBERT M. WILSON.